(12) United States Patent
Teichman

(10) Patent No.: US 10,809,599 B2
(45) Date of Patent: Oct. 20, 2020

(54) MOUNTED CAMERA SUSPENSION AND STABILIZATION SYSTEMS

(71) Applicant: Adam Teichman, Santa Monica, CA (US)

(72) Inventor: Adam Teichman, Santa Monica, CA (US)

(73) Assignee: CINEMA DEVICES, INC, San Fernando, CA (US)

( * ) Notice: Subject to any disclaimer, the term of this patent is extended or adjusted under 35 U.S.C. 154(b) by 0 days.

(21) Appl. No.: 16/517,997

(22) Filed: Jul. 22, 2019

(65) Prior Publication Data

US 2019/0346747 A1     Nov. 14, 2019

Related U.S. Application Data

(63) Continuation of application No. 15/951,980, filed on Apr. 12, 2018, now Pat. No. 10,401,713.

(60) Provisional application No. 62/484,532, filed on Apr. 12, 2017.

(51) Int. Cl.
| | | |
|---|---|---|
| *G03B 17/56* | (2006.01) | |
| *F16M 13/04* | (2006.01) | |
| *F16M 11/26* | (2006.01) | |
| *F16M 11/04* | (2006.01) | |
| *F16M 11/18* | (2006.01) | |
| *F16M 11/20* | (2006.01) | |
| *F16M 13/00* | (2006.01) | |

(52) U.S. Cl.
CPC ......... *G03B 17/561* (2013.01); *F16M 11/046* (2013.01); *F16M 11/18* (2013.01); *F16M 11/2021* (2013.01); *F16M 11/2092* (2013.01); *F16M 11/26* (2013.01); *F16M 13/04* (2013.01); *F16M 11/041* (2013.01); *F16M 13/00* (2013.01); *F16M 2200/044* (2013.01); *F16M 2200/047* (2013.01); *G03B 17/563* (2013.01)

(58) Field of Classification Search
CPC ........ F16M 13/04; F16M 11/04; F16M 13/00; F16M 11/041; G03B 17/56
USPC ....................................................... 396/421
See application file for complete search history.

(56) References Cited

U.S. PATENT DOCUMENTS

| | | | | |
|---|---|---|---|---|
| 3,750,611 | A * | 8/1973 | Field ........................ | B63B 21/08 114/218 |
| 3,765,061 | A * | 10/1973 | Nash ........................ | A43C 3/04 24/134 P |
| 4,037,763 | A * | 7/1977 | Turchen ................. | F16M 13/04 224/153 |
| 4,158,490 | A * | 6/1979 | Gottschalk ........... | F16M 11/048 224/908 |
| 4,206,983 | A * | 6/1980 | Nettman ................. | A45F 3/10 224/201 |

(Continued)

*Primary Examiner* — Clayton E. LaBalle
*Assistant Examiner* — Kevin C Butler

(57) ABSTRACT

The present disclosure provides a body mounted camera suspension/stabilizer, utilizing over the shoulder, dual isolated suspension systems via one tension line passing through the fulcrum point of a telescoping boom pole with lift force created by an independent line suspension to stabilize the camera load as well as provide an even lift force from the floor to several feet overhead of the operator in a single move without the need for counterweights. The apparatus provides for an even lift force throughout the vertical range of the camera load that also further dampens vibrations and operator body movements.

14 Claims, 11 Drawing Sheets

(56) References Cited

U.S. PATENT DOCUMENTS

| | | | | |
|---|---|---|---|---|
| 4,298,149 | A * | 11/1981 | Gottschalk | A45F 3/10 224/201 |
| 4,746,024 | A * | 5/1988 | Hensler | B66C 13/16 182/2.8 |
| 5,360,196 | A * | 11/1994 | DiGiulio | F16M 13/04 224/908 |
| 5,435,515 | A * | 7/1995 | DiGiulio | F16M 11/10 224/908 |
| 5,829,652 | A * | 11/1998 | Denzer | A45F 3/14 224/270 |
| 5,890,025 | A * | 3/1999 | Hart | F16M 13/04 396/420 |
| 6,056,449 | A * | 5/2000 | Hart | F16M 13/04 396/421 |
| 6,611,662 | B1 * | 8/2003 | Groben | A61G 13/10 396/421 |
| 6,764,231 | B1 * | 7/2004 | Shubert | F16M 13/04 396/419 |
| 9,891,506 | B1 * | 2/2018 | Wei | G03B 17/561 |
| 2008/0185411 | A1 * | 8/2008 | Rome | F03G 5/06 224/633 |
| 2008/0304687 | A1 * | 12/2008 | Howell | H04R 1/08 381/362 |
| 2010/0054724 | A1 * | 3/2010 | Chamberlayne | F16M 11/041 396/423 |
| 2010/0124414 | A1 * | 5/2010 | Brown | F16M 13/04 396/421 |
| 2010/0254696 | A1 * | 10/2010 | McKay | F16M 13/04 396/420 |
| 2011/0240705 | A1 * | 10/2011 | Landano | A45F 3/047 224/676 |
| 2012/0099851 | A1 * | 4/2012 | Brown | F16M 13/04 396/421 |
| 2013/0094847 | A1 * | 4/2013 | Di Leo | F16M 13/04 396/421 |
| 2016/0259228 | A1 * | 9/2016 | Hellsten | G02B 7/002 |
| 2016/0305602 | A1 * | 10/2016 | Carthey | F16M 11/2035 |
| 2017/0108168 | A1 * | 4/2017 | Pan | F16M 11/16 |
| 2017/0231370 | A1 * | 8/2017 | Crimaldi | A45F 3/08 224/637 |
| 2017/0327129 | A1 * | 11/2017 | Cylvick | B61B 12/028 |
| 2018/0084893 | A1 * | 3/2018 | Landano | A45F 3/10 |
| 2018/0106425 | A1 * | 4/2018 | Brown | F16M 11/10 |

* cited by examiner

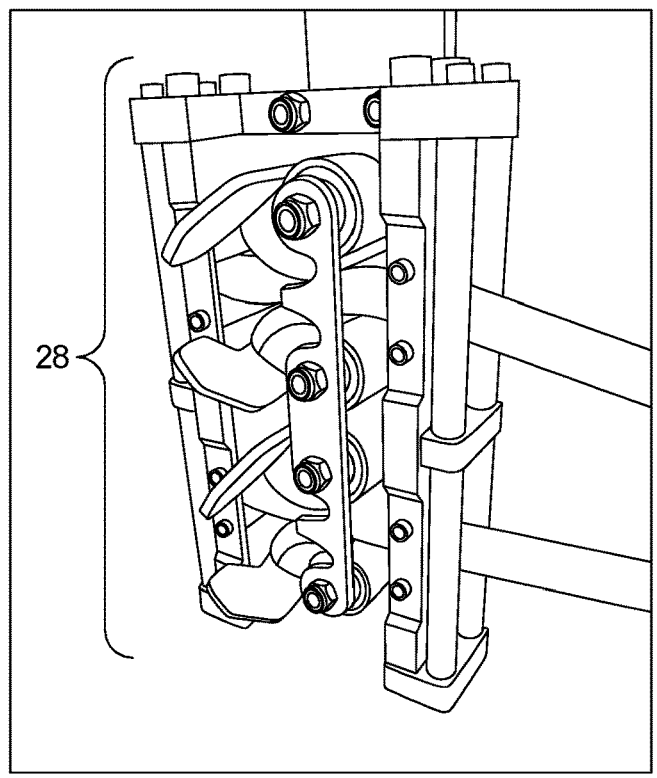
FIG. 8
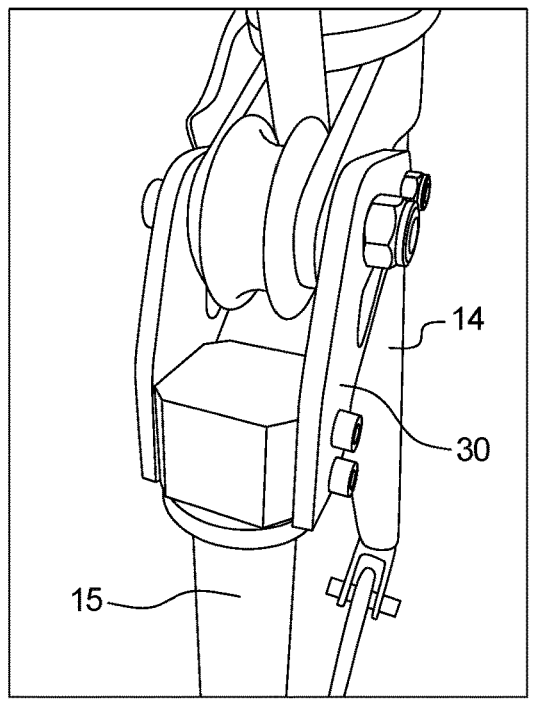
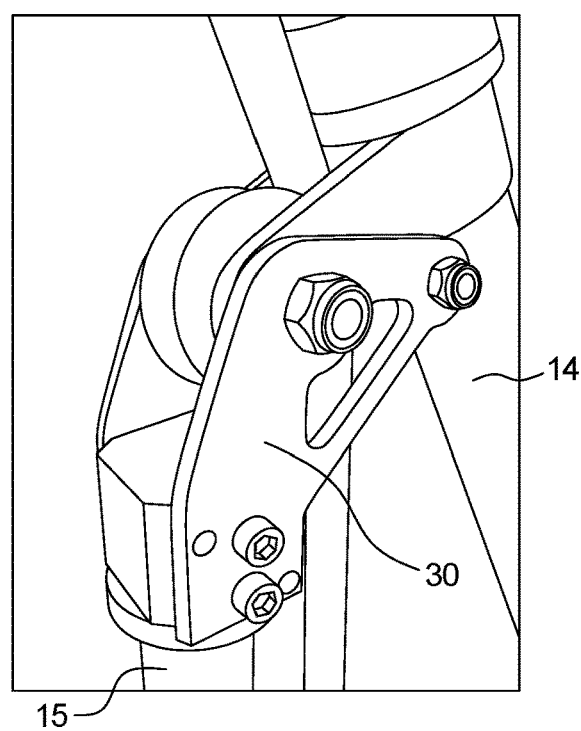
FIG. 9A  FIG. 9B

MOUNTED CAMERA SUSPENSION AND STABILIZATION SYSTEMS

CROSS-REFERENCE TO RELATED APPLICATIONS

This application is a continuation application of U.S. patent application Ser. No. 15/951,980 filed Apr. 12, 2018, which claims the benefit of priority to U.S. Provisional Application 62/484,532 filed on Apr. 12, 2017, both of which are incorporated by reference in their entirety.

BACKGROUND OF THE INVENTION

The present subject matter relates generally to mounted camera suspension and stabilization systems that can be worn by a user.

Cameras and camera rigs can be heavy to hold for even a short duration of time. Conventional rigs that support cameras often introduce unwanted transmitted body movements and shake. They also limit the range of vertical positioning and travel.

In addition, conventional systems that utilize tension cords or elastic tubing, present buoyancy over a range too limited to provide even lift from floor to overhead of the operator in a single vertical camera movement. As a result, such systems have to be preset in each different position. In addition to this limited range, unwanted body motion and footsteps are transmitted through the ridged supports, through the lines, and into the load.

Accordingly, there is a need for a system with an even lift tension throughout an extended vertical range of the camera load without the need to utilize counterweights, and can also further dampen vibrations and operator body movements.

BRIEF SUMMARY OF THE INVENTION

The present disclosure provides a body mounted camera suspension/stabilizer, utilizing over the shoulder, dual isolated suspension systems, via telescopic poles, to create lift as well as stabilize a camera load, providing an even lift tension from the floor to several feet overhead of the operator in a single move without the need for counterweights. Various examples of the systems are provided herein.

In an example, the present system provides a hand held camera, and hand held camera gimbal operators, that provide relief from the heavy weight of the camera and camera rig by displacing the weight of the equipment to the hips and torso of the user. As a result, the system stabilizes all unwanted transmitted body motion derived from the user while operating the camera system. Further, the present system creates an even lift tension throughout an increased vertical range from the floor to several feet above the operators head in a single smooth camera move.

The present system utilizes the use of actively moving articulated arms that create lift from a suspension system mechanically isolated from the elastic tubing that is suspended from the arms, which supports the camera load. The camera line passes through a fulcrum clamp housing a fulcrum bearing roller on the fulcrum axis of the articulated arm and is tensioned separately from the tension line on the rear of the articulated arm. Because the elastic tubing supporting the camera load is routed through the boom arm fulcrum axis, there is no tension created or influence exerted on the lift of the arm created by the separately routed elastic tubing from the rear of the arm. This method provides isolation between the independent forces of these two lift factors, further isolating body motion. The double independent suspension system provides an even lift tension throughout a much greater vertical travel range of the camera compared to conventional systems.

For example, conventional systems often utilize rigidly positioned arms and support structures that limit vertical lift range and elasticity, creating unwanted camera shake as well as a limited range of boom height within a given camera move. The conventional systems limit the amount of elasticity in the line by limiting the travel distance. Further, in such systems, tension adjustments need to be performed with the device off the operator's body or be performed by a second remote person.

In contrast, the present system and apparatus allows for an even lift tension throughout the vertical range of the camera load that also further dampens vibrations and operator body movements. The system also allows for active operator tension adjustments while the apparatus is on the body of the operator. The systems allows for stable photography for motion picture or still photography where high and low angles need to be achieved.

Although the present disclosure focuses on a camera mounting system, the present system and apparatus is not limited to such application. The system can be used for any activity requiring steady instrumentation that needs weight displacement, stability, and reach access (e.g., a painting apparatus).

The present apparatus can include a body mounted vest that secures the device to the user, wherein telescopic articulating poles with adjustable lift, of which tensioning is isolating from separate lengths of elastic tubing that is used to suspend the camera load. The telescopic sections on the vertical boom mast poles create variance in boom arm height to effect the vertical travel ranges of the suspended camera load. The tension can be independently adjusted from the sides of the waist of the vest worn by user for articulating arm lift and independent camera line lift. The system can include U groove bearing rollers that transfer the stretch characteristics of the elastic tubing throughout the length of the telescoping poles. The U groove roller bearing can be mounted on the same radial fulcrum axis of the articulating arm support bearings in order to route the camera load elastic tubing.

The system can include a mechanism for supporting a camera load at the distal ends of the elastic tubes. For example, the elastic tubes can be used to suspend a gimbal and/or camera housing frame, wherein the camera housing frame connects to a camera. Further, the system can include an operating frame that can engage with the camera housing frame, wherein the operating frame can be used by a user to manipulate the position of the camera.

An advantage of the present system is that it allows for active operator tension adjustments while the apparatus is on the body of the said operator and a camera load is being suspended.

A further advantage of the present system is presenting a system that avoids a user to carry a heavy camera rig for any amount of time.

Another advantage of the system is avoiding unwanted transmitted body movements from a user controlling the camera.

Another advantage of the present system is providing for vertical positioning and travel.

Another advantage is the ability of the operator to carry the load for extended durations due to the elimination of heavy counterweights needed to create a floor to ceiling lift range.

Another advantage includes the isolation of the two lift forces from that of the boom arm and that of the elastic tubing holding the camera load is created via the routing of the load lift tubing through a bearing roller on the same fulcrum axis and drive shaft as the structural pivoting bearings for the fulcrum clamp of the overhead articulated telescopic boom pole. In addition, the force exerted through the top elastic tubing running through the fulcrum bearing has no influence on the hit of the boom pole, but the top elastic tubing just supporting the camera load (e.g., camera housing frame). This is one of the most unique principals of how this device removes footsteps that is different from any other device.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 6A-6B are perspective views of, wherein FIG. 6A depicts an example of a U bearing roller, wherein FIG. 6B depicts a boom pole clamp mounted to an articulating hinge fulcrum.

FIG. 8 is a perspective view of a tensioning cam cleat assembly on the body of the best for securing an elastic tubing.

FIGS. 9A-9B are perspective views of a U bearing roller within a hinge joint on the telescoping boom pole.

DETAILED DESCRIPTION OF THE INVENTION

The present disclosure provides a body mounted camera suspension and stabilizer, utilizing over the shoulder, dual isolated suspension systems, via telescopic boom poles, to create lift as well as stabilize a camera load, providing an even lift tension from the floor to several feet overhead of the operator in a single move without the need for counterweights.

Figure 1:
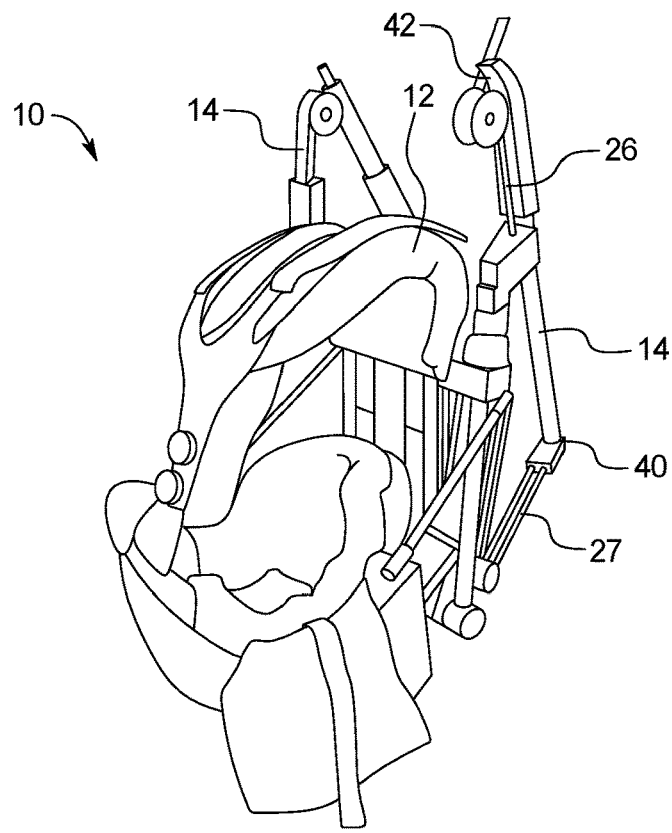
FIG. 1 is a perspective view of an example of the camera mounting support and stabilization system as disclosed herein.
Figure 2:
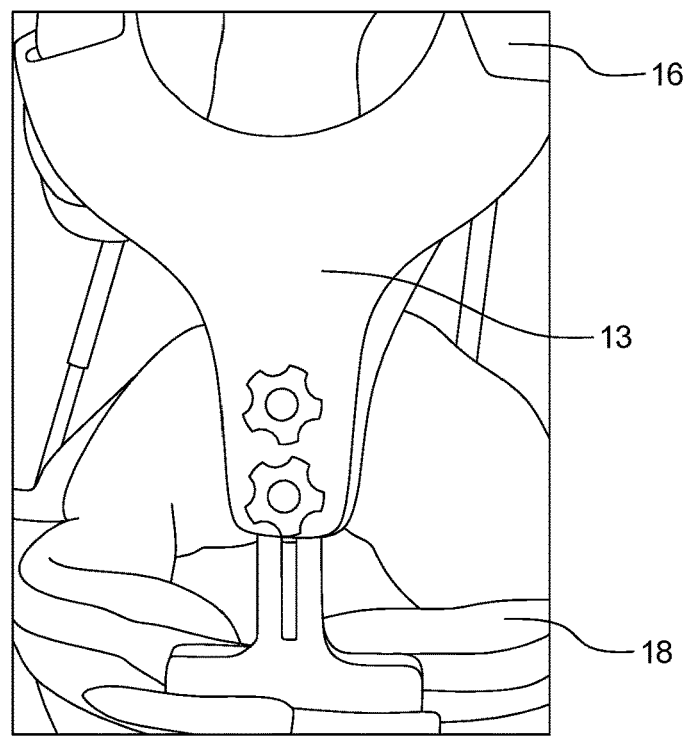
FIG. 2 is a perspective view of an example of a front portion of the vest.

As shown in FIG. 1, the present system can include a body mounted system 10 which holds the telescopic boom poles 14 with adjustable lift, of which tensioning is isolated from separate lengths of elastic tubing 26/27 that suspend the camera load 50. As shown in FIG. 2, the vest 12 can be worn by a user, wherein the vest provides security around the user's torso. The vest 12 can include shoulder area 16 and waist area 18, wherein straps, buckles, belt, tightening ratchets, among other securing mechanism to secure the vest 12 to the user's shoulders and waist.

The vest 12 can include a rigid front torso plate 13, such as a T-shaped padded. The padded plate can connect to vest straps to secure the plate to the user, e.g., shoulder straps and waist straps. The padded torso plate 13 can be adjustable length and width according to the user's dimensions. Alternatively, or in addition to, the T-shaped padded plate 13 can also be positioned on the back of a user's torso.

Figure 3:
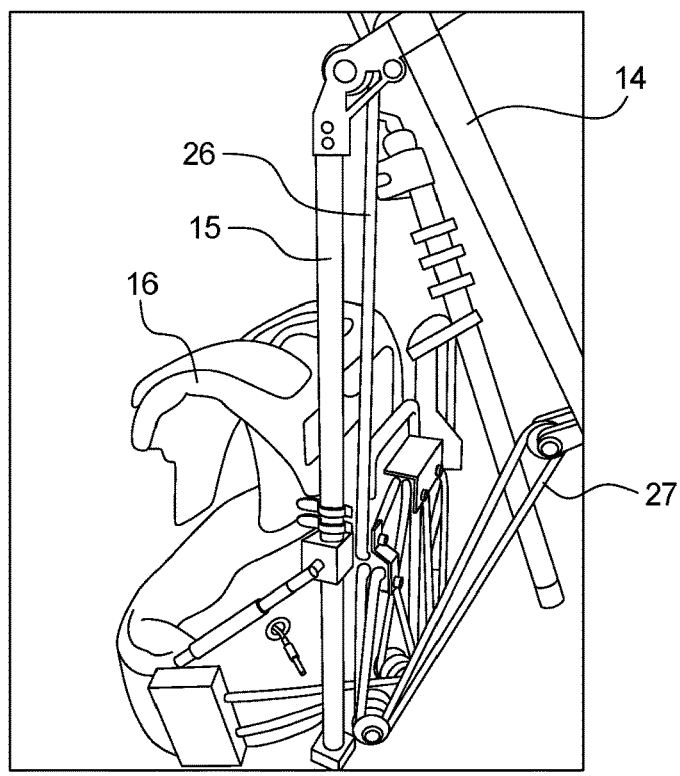
FIG. 3 is a perspective view of an example of a back portion of the vest including the roller frame.
Figure 4:
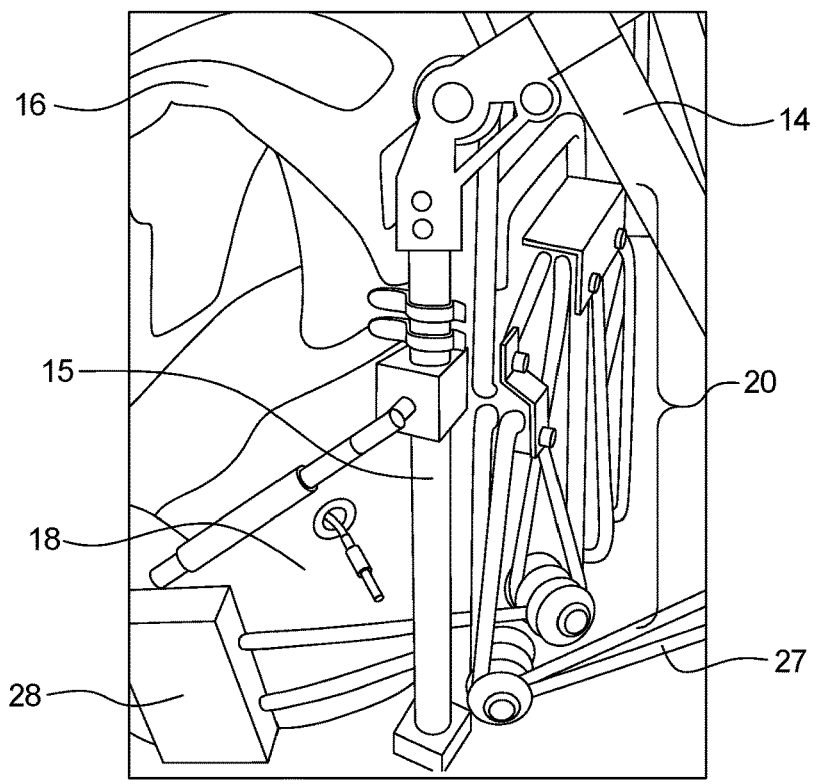
FIG. 4 is a perspective view of an example of the back portion of the vest including the roller frame and the vertical adjustable frame.
Figure 5:
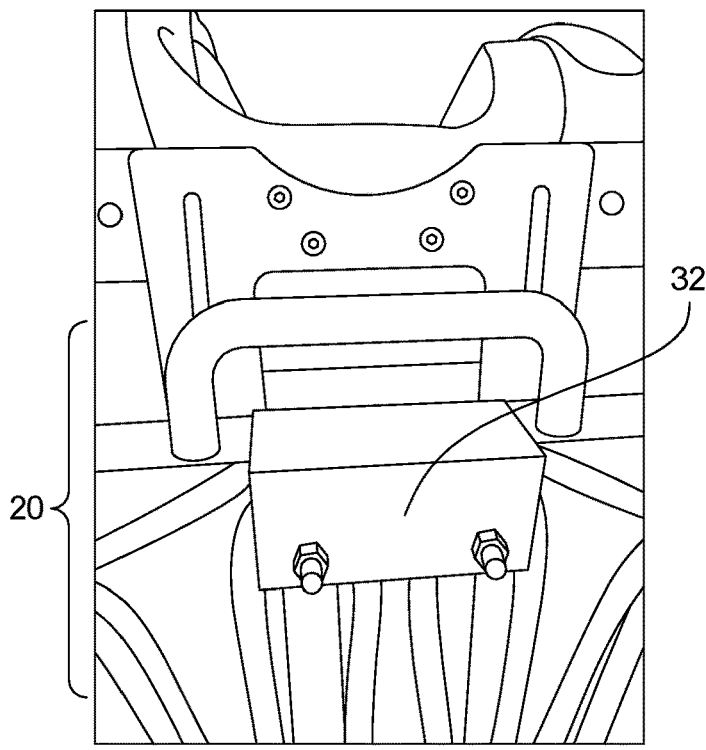
FIG. 5 is a perspective view of an example of a vertical adjustable arm frame positioned on the back portion of the vest.

As shown in FIGS. 3-5, the system can include a back frame 20 secured to and by the shoulder straps, back pad, and the lower waist section of the vest body 12. The back frame 20 can include at least two rollers 24 to receive top elastic tubing 26 and bottom elastic tubing 27 that can be used to adjust the position of two boom poles 14 and thereby the suspended camera 50. Two telescoping mast poles 15 can be connected to the back frame 20 and/or back plate 32, wherein each mast pole includes a mast pole fixed end 60 and a mast pole telescoping end 62, wherein the mast pole fixed end 60 is attached to the back frame 20, wherein the mast pole telescoping end 62 is configured to extend above the back frame 20, wherein the mast pole telescoping end 62 connects to a hinge fulcrum clamp 30. In an example, the fulcrum clamp 30 includes a fulcrum bearing roller to receive the top elastic tubing. The mast poles 15 are held in place on each side by the back frame, wherein the mast poles 15 provide swivel capabilities. Each telescopic mast pole 15 includes a hinged fulcrum clamp 30 positioned on the telescoping end of the mast pole 15. The system 10 further includes two telescoping boom poles 14 that connect via the hinged fulcrum clamp 30, wherein the boom poles 14 can extend to suspend a load such as a motion picture camera 50 via a gimbal.

In an example, boom poles 14 are used to suspend, via elastic tubing, a camera housing frame 44 in front of the user.

As shown in FIGS. 7A-7E, the telescopic boom poles 14 include a first end 52 and a second end 54, wherein the first end 52 extends over the user's shoulder when extended, and connects to the extended frame 44 via the top elastic tubing 26. The second end 54 connects to the back frame 20 via the bottom elastic tubing 27. The telescopic boom poles 14 can suspend the camera load 50 via the top elastic tubing 26 passing through a top U groove bearing roller 25 that are included on each first end 52 of the boom poles 14. The second end 54 of the boom poles 14 have bearing U rollers 24 for receiving the bottom elastic tubing 27 that can be anchored by the back frame 20 through adjustable cinch cleats 28.

Figure 6A:
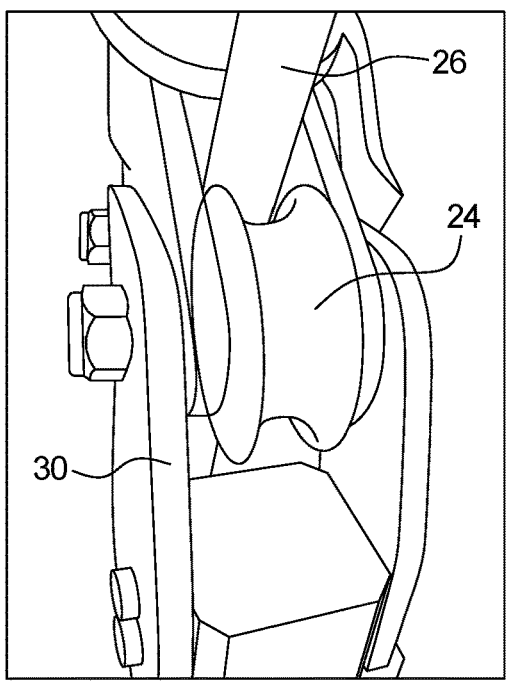
Figure 6B:
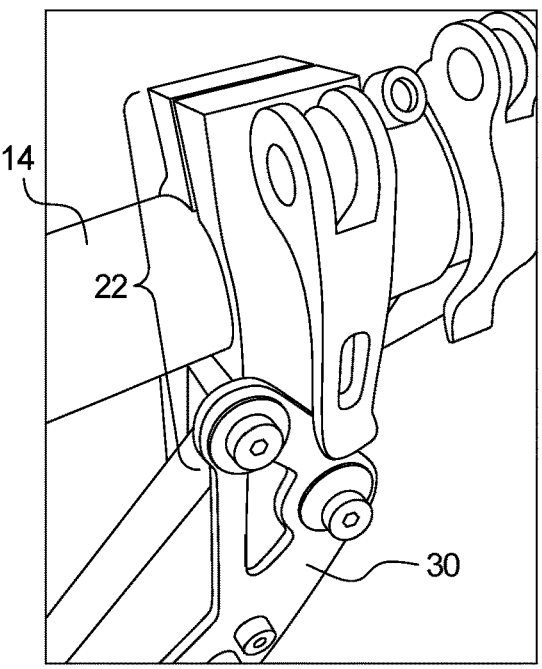
Figure 7C:
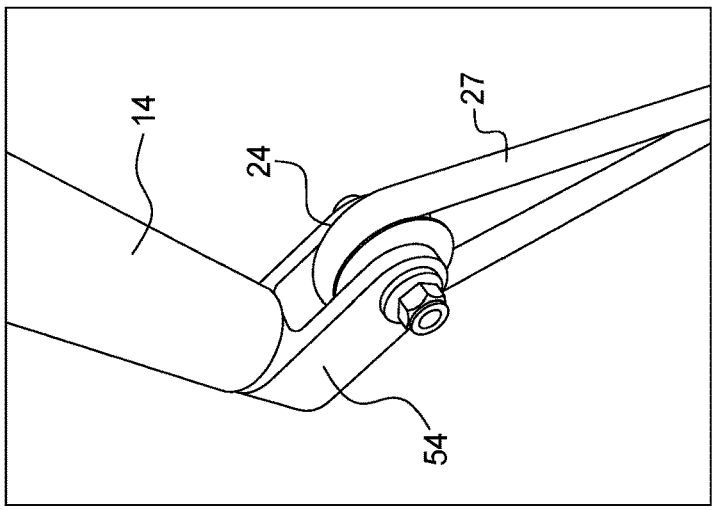
FIGS. 7A-7E are perspective views of an example of a U bearing roller on the telescoping boom pole.
Figure 7B:
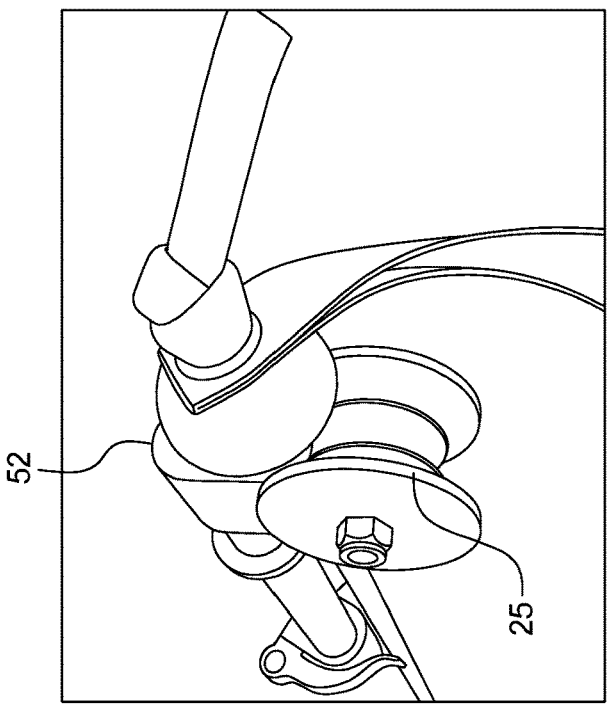
Figure 7A:
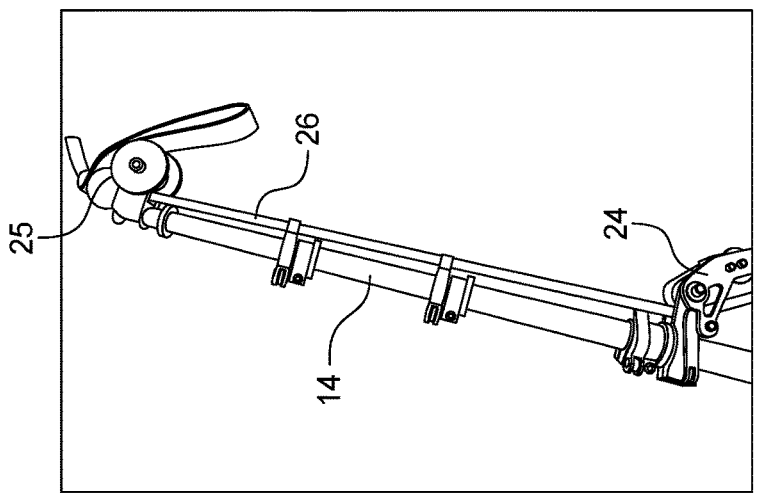
Figure 7E:
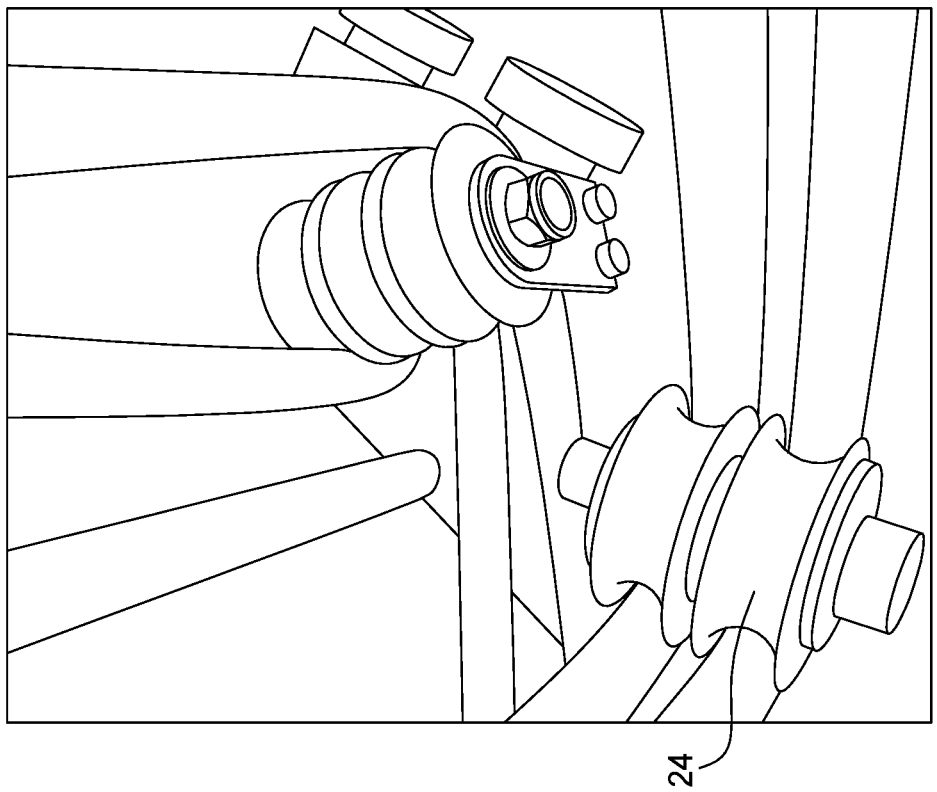
Figure 7D:
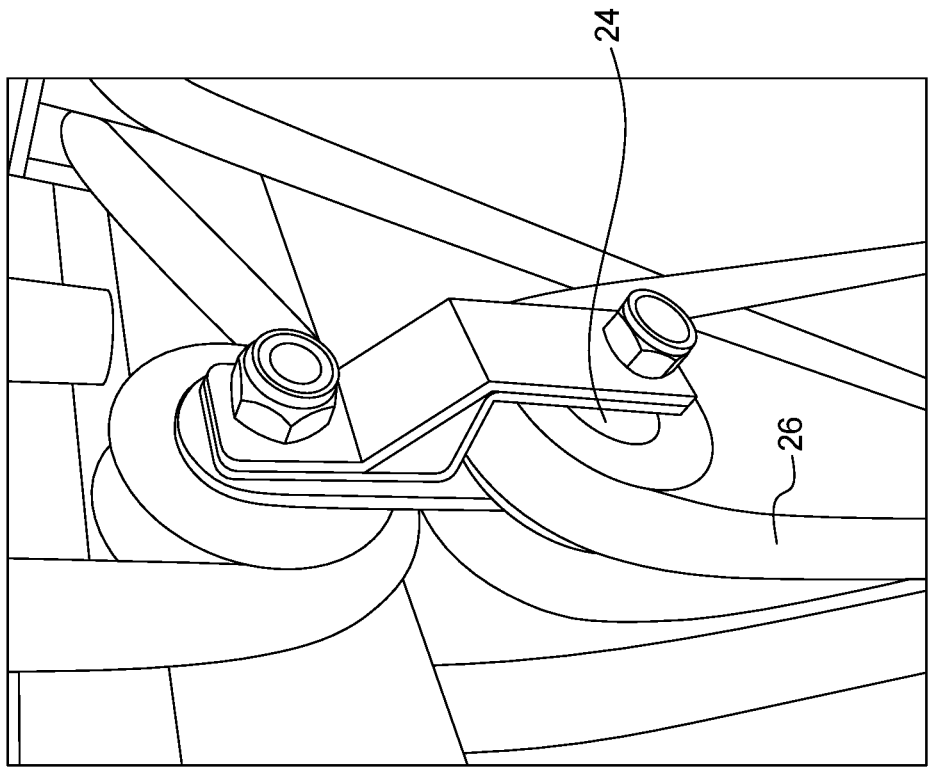

FIG. 6A illustrates a U bearing roller 24 for receiving the top elastic tubing 26 used for controlling the placement of the boom pole 14. As shown in FIG. 6B, the boom poles 14 can be supported by two articulating clamps 22 supported by the hinged fulcrum clamp 30. Additional U bearing rollers can be included along each of the boom poles 14 and mast poles 15 for receiving the top elastic tubing 26 and the bottom elastic tubing 27, respectively.

In other words, the system includes two independent paths of elastic tubing. The bearing rollers 24 that suspend the camera housing frame 44 for the camera load 50 has an independent path of elastic tubing 26 that also passes to independent adjustable cinch cleats 28. A second elastic tubing 27 (i.e., the bottom elastic tubing 27) is connected to the second end of the vertical boom pole 14, wherein the bottom elastic tubing 27 is secured by the cinch cleats 28.

Figure 10:
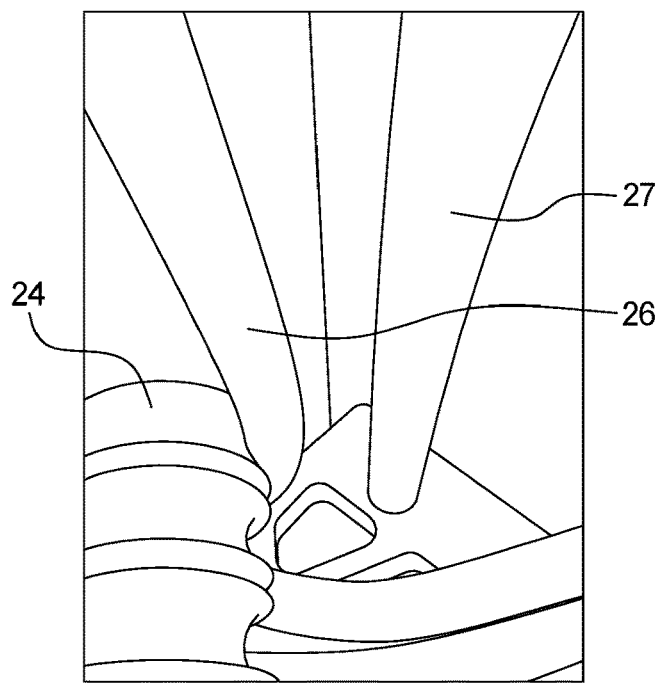
FIG. 10 is a perspective view of two separate elastic tubings that operate independently on a common roller axis to control the camera suspension.

The cinch cleats 28 can be positioned on the waist portion 18 of the vest. Alternatively, the cinch cleats can be on a separate belt for the user. The cinch cleats 28 are used to securing and adjusting the elastic tubing. The poles can be held from the pivoting pole support clamp 22 supported by bearings within hinges 30, as shown in FIGS. 9A-9B, atop two vertical telescopic boom poles 14 arising from the back plate 32 between the upper and lower vest sections. As shown in FIG. 10, and mentioned previously here, two independent elastic tubes (i.e., top elastic tube 26 and the bottom elastic tubing 27) can be used to provide lift tension to the arm via passing through the rear U groove roller 24 bearings, from the rear plate anchor points, and pass throughout the side cleats 28 for tensioning.

The vertical telescoping masts 15 can telescope out to different lengths to raise and lower the boom poles 14. The masts 15 can also pivot on axis. The vertical poles 14 can also slide fore and aft through the boom pole fulcrum clamp 30 to enable a longer rear length of arm from the fulcrum point 30 to create more lift tension. The elastic tubes 26 can attach to the camera hooks 38 on the end of the extended frame 44, wherein the elastic tubes 26 thread through the U groove roller bearings 25 on the first end 52 of the boom poles 14, proceed through the arm fulcrum axis U groove roller bearings 24, through an independent set of U groove roller bearing assemblies affixed to the back plate 20, to the tensioning cleats 28 on the side of the waist section of the vest body 12.

The system 10 isolates camera motion and gives a range of movement through the use of two isolated suspension systems (i.e., top elastic tubing 26 and bottom elastic tubing 27). A first suspension system via the bottom elastic tubing 27 is used for the rear counter force of the up-and-down articulation of the telescopic poles 14 over the right and left shoulder of the operator. This is achieved via the elastic tubing 27 threaded from an anchor point on the frame, through the rear bearing roller on the boom poles 14, back to bearing rollers on the back frame 20 to the tensioning cam cleats 28 on each side of the lower waist section of the vest. The second isolated suspension system is achieved through the top elastic tubing 26 directly connecting to the camera load through the front bearing roller 25 of each overhead articulated telescopic boom pole 14. Once the vertical poles 14 are extended and the lift tension is set via the top elastic tubing 26 and bottom elastic tubing 27, the excess elastic tubing 26 on the outside of the cam cleats 28 can be wrapped or folded away in pouches on the lower front of the vest.

The system 10 provides dual lift force isolation by the camera support tubing being routed through a bearing roller 24 on the same fulcrum axis and drive shaft as the structural pivoting bearings for the fulcrum clamp 30 of the overhead articulated telescopic boom pole 14. In an example, there is no mechanical influence from the force lifting the articulating overhead boom poles 14 to that of the force routing through the fulcrum point, e.g., fulcrum clamp 30, that is actually suspending the camera load from the poles 14. In other words, there is no mechanical influence from the force exerted from the elastic tubing 27 lifting the articulating overhead telescopic boom poles 14 to that of the force exerted from elastic tubing 26 routing through the fulcrum point suspending the camera load from the telescopic boom poles 14. The effect of the dual isolated suspension is double dampening of any body motion by the user, as well as improved vertical range. The top elastic tubing 26 proceeds through multiple rollers 24 on the back frame 20 for extended elasticity, to two independent cam cleats 28 for independent tensioning for both arm lift via elastic tube 26 (e.g., boom poles 14 and mast poles 15) and camera load lift (e.g., camera housing frame 44 and/or operating frame 55).

The camera line top elastic tubing 26 can connect to receiving hooks 38 of a camera receiving frame 44, wherein the camera receiving frame 44 can tilt the camera 50 via an adjustable fulcrum point bearing 40. The fulcrum bearing 40 at the receiving hooks 38 can maintain the camera load level such that the camera load is on the same axis as the suspension point from the elastic tube 26. Such configuration isolates any unintentional up and down (Z axis) movement from the operator's arms as it is absorbed in the rotation of the bearing 40 and not translating to vertical up and down movement avoiding shake in the camera load.

Figure 11:
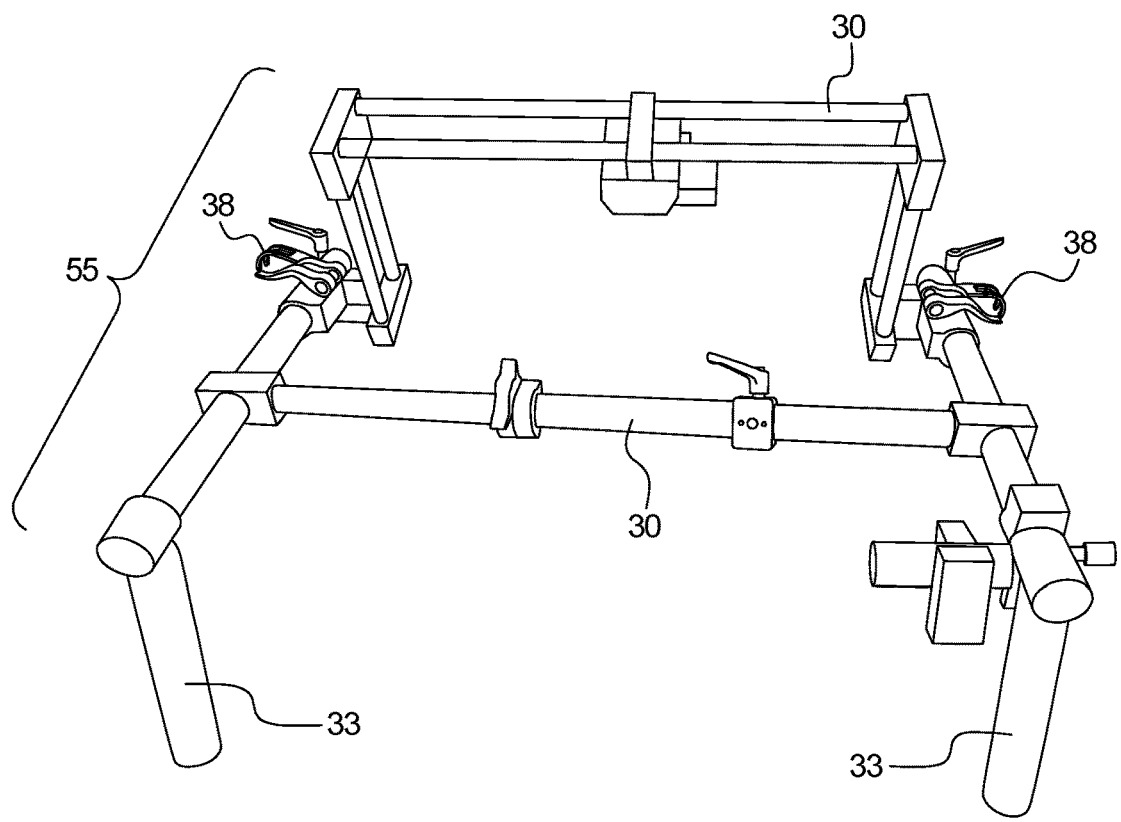
FIG. 11 is a perspective view of an example of an operating frame that can be used in combination with the body vest suspension system.
Figure 12:
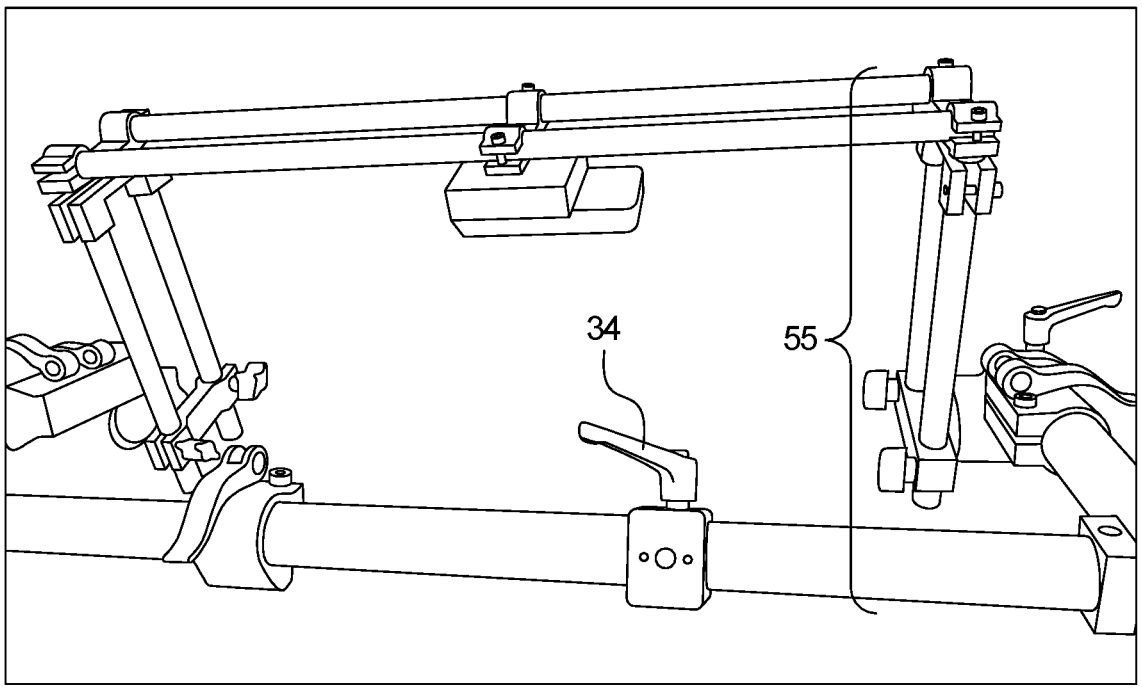
FIG. 12 is a perspective view of an example of a crossbar of the operating frame including a video monitor receiver.
Figure 13:
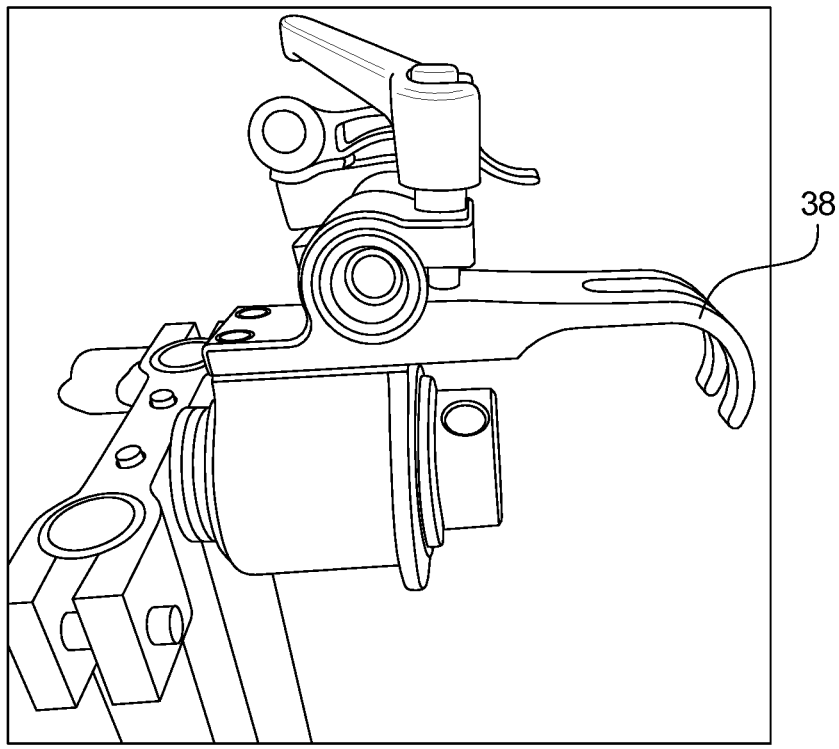
FIG. 13 is a perspective view of an example of an elastic tube receiver hook.
Figure 16:
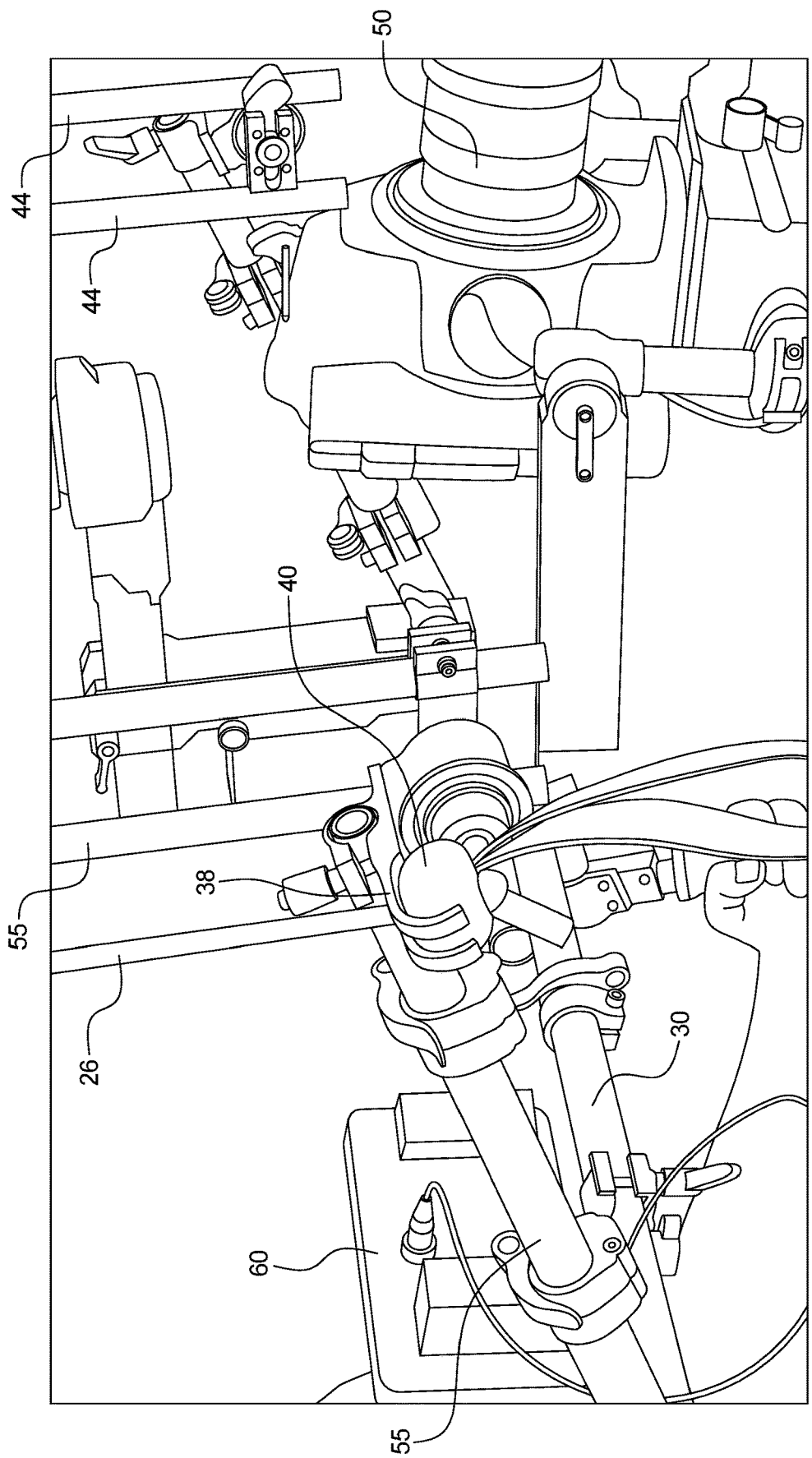
FIG. 16 is a perspective view of the camera housing frame engaged with the operating frame.

In an example, the end of the elastic tubing 26 can include a ball bearing 40 that can be hooked into the receiver hooks 38 to suspend the extended frame assembly 44 from the vertical poles 14. The camera housing frame 44 can include a bearing 40 with a vertical adjustment to tilt the camera at the center of gravity point for camera/gimbal leveling. In an example, the camera receiving frame 44 can engage with an operating frame 55, as shown in FIG. 11, that can include a horizontal crossbar 30, at least two handles 33, and a camera receiving mechanism (e.g., camera mounting section) to secure the camera 50 to the camera receiving frame 44, as shown in FIG. 16. The fulcrum bearing 40 can be used with the operating frame 55 such that the bearing maintains the gimbal (and/or camera housing frame 44) and the camera 50 level through the vertical travel and isolates the Z-axis motion from the operator's movements. The pivot axis of the bearing 40 is at the point of suspension from the elastic tubing 26.

Figure 14:
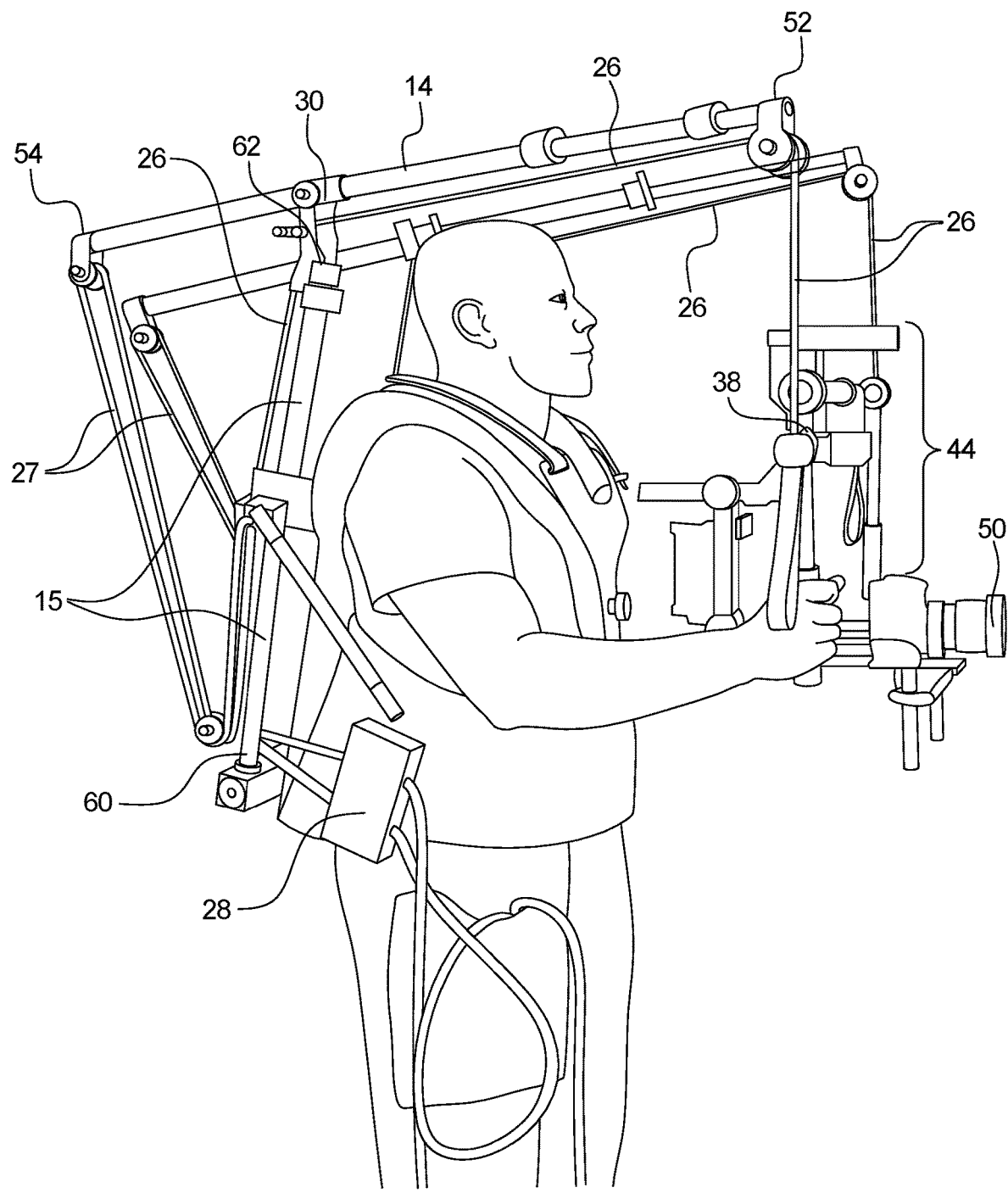
FIG. 14 is a side view of an example of the vest system worn by a user and suspending a camera.

As shown in FIG. 14, moving the camera 50 up and down can be performed almost effortlessly by raising and lowering the camera load via the top elastic tubes 26 and bottom elastic tubes 27. Additional control interfaces can be mounted on the handles. By attaching a camera housing frame 44 wherein the camera housing frame 44 includes handles, extra vertical lift range from floor to overhead can be achieved without the operator needing to bend down, and can extend a pass the operators reach. In an example, the camera housing frame 44 can be a conventional gimbal.

Figure 15:
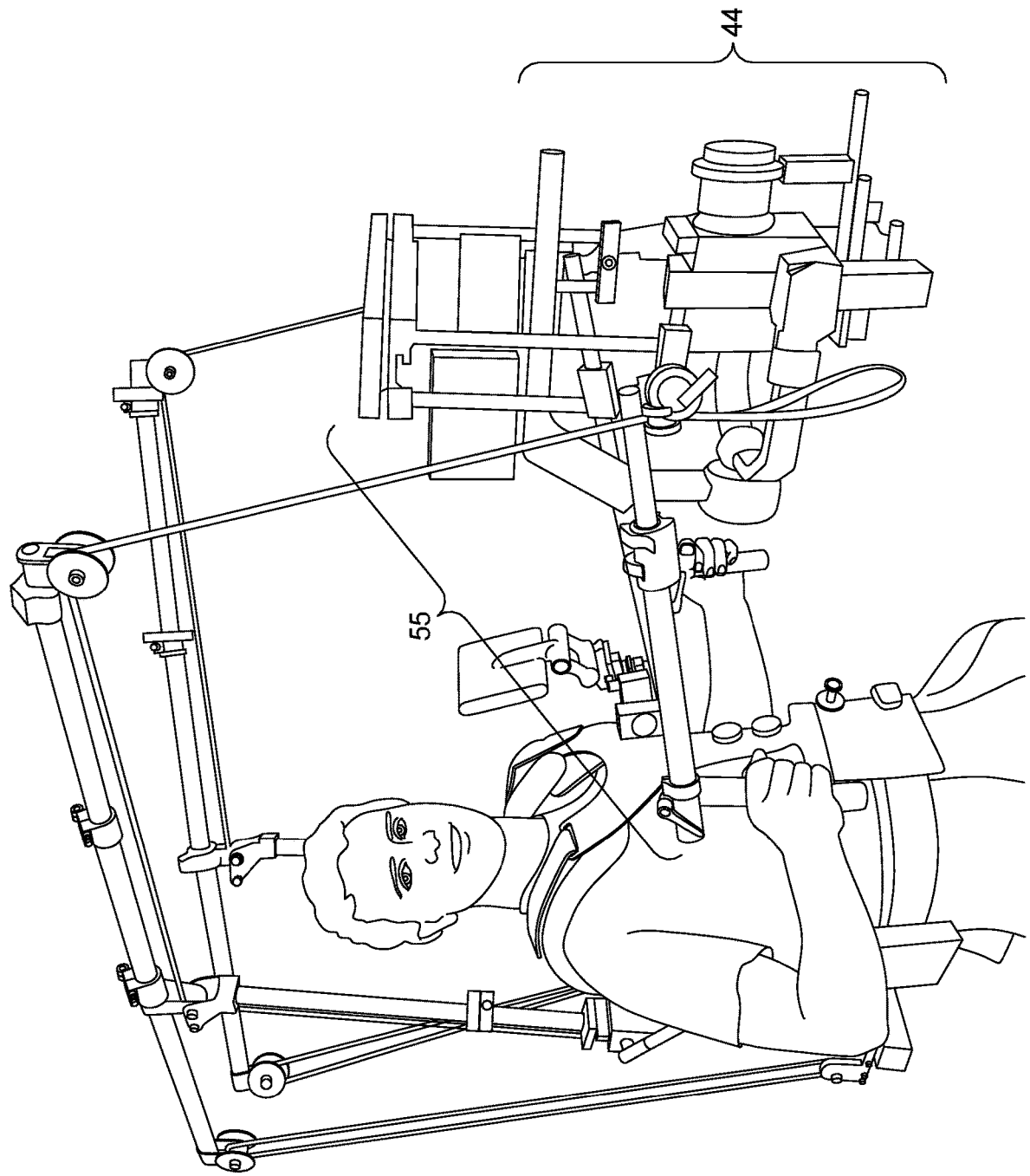
FIG. 15 is a side view of an example of the vest system worn by a user, wherein the system includes an operating frame to manipulate the camera.

As shown in FIG. 15, the system 10 is shown operated by a user wherein the camera housing frame 44 is used in combination with the operating frame 55, such as the operating frame 55 of FIG. 11. The operating frame 55 can engage with a gimbal that can include a horizontal bar and handles, wherein the handles are replaced with the handles of the operating frame 55. The operator can directly hold the gimbal with rigid fixed handles 33 of the operating frame 55 and can manually tilt and pan the camera 50. By using the operating frame 55, the gimbal can stay level via the two bearings 40 and the tilt manipulation can be controlled by a third-party electric remote control.

In the configuration illustrated in FIG. 15, the operator can raise and lower the camera 50 by applying a rotational force on the handles 33 of the operating frame 55 with his wrists in combination with moving his arms, wherein the force can raise the arm and tilt it up, yet not twist it on and axial rotation. In this configuration, just raising his arms or hands without applying a rotational angular force with his wrists, will lift the telescopic arms attached to these bearings, but will not cause the camera to move up and down. Such configuration offers a further level of Z axis (up and down) isolation.

FIG. 16 illustrates an close-up view of the bearing 40 that keeps the gimbal and/or camera level throughout the vertical boom range, floor to ceiling. In this configuration there can be a third party electric joystick control to tilt and pan the camera electrically. In an example, the crossbar with the monitor 60 attached keeps a level view regardless of the height of the camera.

A monitor 60 can be mounted on a crossbar 30 of the operating frame 55 between the two extension rods where the monitor 60 can be viewed at an appropriate viewing angle. However, the present device 10 can be used to hold any handheld instrument that requires weight displacement from the operator's arms to the hips, as well as the body motion stabilization of that load, not only camera systems. Any steady instrumentation that requires weight displacement, stability and reach access, such as a painting apparatus.

In an example, the system 10 can be used with other mounting systems. For example, the vertical articulating arm supports and the U groove roller assemblies can be mounted to a modular frame that can attach to a single point on a lower section of a body garment and/or chair that can mount the cleat assembly.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

I claim:

1. A camera suspension system comprising:
    a vest to be worn by a user;
    a camera load;
    an elastic member secured at a first end to the vest body and at a second end to the camera load such that the elastic member suspends the camera load from a fixed position located above the camera load;
    one or more tensioning cam cleats through which the elastic member passes, wherein a user selectively lengthens and shortens a length of the elastic member spanning the fixed position and the camera load to raise and lower the camera load by pulling or releasing a length of the elastic member through the one or more tensioning cam cleats.

2. The camera suspension system of claim 1, wherein the elastic member is an elastic tube.

3. The camera suspension system of claim 1, wherein the elastic member rides along at least one bearing roller connected to a boom pole.

4. The camera suspension system of claim 1, wherein the one or more tensioning cam cleats are located on a waist portion of the vest.

5. The camera suspension system of claim 1, wherein the camera load includes at least two camera hooks to receive the elastic member.

6. The camera suspension system of claim 1, wherein the camera load includes a horizontal bar with a camera hook on each end of the horizontal bar to receive the elastic member.

7. The camera suspension system of claim 1, wherein the camera load includes a horizontal bar with a camera hook on each end of the horizontal bar to receive two elastic members, wherein the horizontal bar includes a camera mounting section to receive a camera.

8. A camera suspension system comprising:
    a mounting system;
    a camera load;
    an elastic member secured at a first end to the mounting system and at a second end to the camera load such that the elastic member suspends the camera load from a fixed position located above the camera load;
    one or more tensioning cam cleats through which the elastic member passes, wherein a user selectively lengthens and shortens a length of the elastic member spanning the fixed position and the camera load to raise and lower the camera load by pulling or releasing a length of the elastic member through the one or more tensioning cam cleats.

9. The camera suspension system of claim 8, wherein the mounting system is an external overhead system for suspending a camera.

10. The camera suspension system of claim 8, wherein the elastic member is an elastic tube.

11. The camera suspension system of claim 8, wherein the elastic member rides along at least one bearing roller connected to a boom pole.

12. The camera suspension system of claim 8, wherein the camera load includes at least two camera hooks to receive the elastic member.

13. The camera suspension system of claim 8, wherein the camera load includes a horizontal bar with a camera hook on each end of the horizontal bar to receive the elastic member.

14. The camera suspension system of claim 8, wherein the camera load includes a horizontal bar with a camera hook on each end of the horizontal bar to receive two elastic members, wherein the horizontal bar includes a camera mounting section to receive a camera.

* * * * *